United States Patent [19]
Schulz et al.

[11] Patent Number: 5,137,169
[45] Date of Patent: Aug. 11, 1992

[54] THERMAL INSULATION DEVICE

[75] Inventors: Klaus-Peter Schulz, Heidelberg; Uwe Heidtmann, Nussloch; Horst Eschenbach, Waldbrunn, all of Fed. Rep. of Germany

[73] Assignee: Asea Brown Boveri Aktiengesellschaft, Mannheim, Fed. Rep. of Germany

[21] Appl. No.: 622,933

[22] Filed: Dec. 6, 1990

[30] Foreign Application Priority Data

Dec. 8, 1989 [DE] Fed. Rep. of Germany ....... 3940649

[51] Int. Cl.$^5$ .............................................. F17C 1/00
[52] U.S. Cl. ................................................... 220/421
[58] Field of Search .................... 220/421, 422, 901

[56] References Cited
U.S. PATENT DOCUMENTS

| | | | |
|---|---|---|---|
| 2,961,116 | 11/1960 | Jeppson | 220/421 |
| 3,698,588 | 10/1972 | Pogorski | 220/422 |
| 3,765,558 | 10/1973 | Withers | 220/901 X |
| 3,942,331 | 3/1976 | Newman, Jr. et al. | 220/421 X |
| 4,425,413 | 1/1984 | Ziegenbein et al. | 220/422 X |
| 4,606,196 | 8/1986 | Acharya et al. | 220/421 X |
| 4,692,363 | 9/1987 | Reiss et al. | 220/421 X |

Primary Examiner—Steven M. Pollard
Attorney, Agent, or Firm—Herbert L. Lerner; Laurence A. Greenberg

[57] ABSTRACT

In thermal insulation devices which include a molded part formed of thermal insulation material and a metal housing enclosing the molded part, an evacuation of the thermal insulation device with the aid of a vacuum pump requires a relatively long pumping time. The invention proposes providing groove-like recesses in the molded part for reducing the suction resistance. The groove-like recesses form suction channels together with the wall of the metal housing. Such vacuum thermal insulation devices are used, for example, for thermally insulating high-temperature batteries.

10 Claims, 2 Drawing Sheets

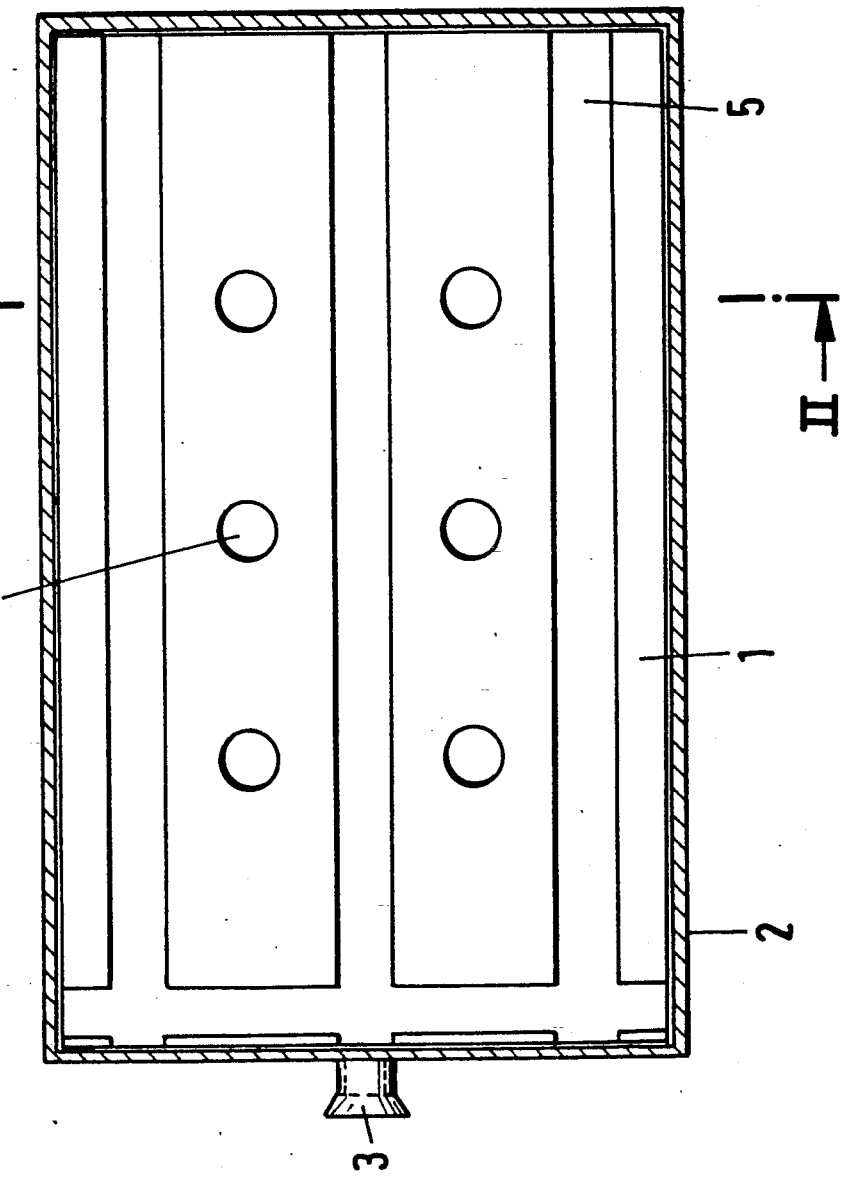

THERMAL INSULATION DEVICE

The invention relates to a thermal insulation device which is also known as vacuum insulation. Such a thermal insulation device may include a double-walled, gas-tight metal housing with a block shape, for example, and an interspace that is filled with a porous thermal insulation material and is evacuated. However, the thermal insulation device may also be constructed on the same principle as a thermally insulating plate or it may have any other desired shape.

Such thermal insulation devices are used, for example, as housings for high-temperature batteries. In the case of a sodium/sulphur battery, for example, battery cells which operate at about 300° C. have to be thermally insulated against the ambient temperature.

Such a double-walled housing constructed as a thermal insulation device includes an inner housing and an outer housing made of relatively thin sheet metal which is pressure-molded in the evacuated state due to air pressure that acts externally. In order to prevent a direct thermal radiation exchange from taking place between the inner wall and the outer wall and also to generally support the inner housing with respect to the outer housing, a suitable support device is necessary. This may be expediently provided by using a molded part formed of thermal insulation material which may be composed, for example, of ceramic fibers or glass fibers. In order to improve the insulation action, the gases present are extracted from the interspace between the inner housing and the outer housing at the conclusion of the manufacture of the thermal insulation device, with the aid of a vacuum pump.

The evacuation operation takes a long time, namely several hours, depending on the housing dimensions, because the insulation material represents a large suction resistance.

It is accordingly an object of the invention to provide a thermal insulation device, which overcomes the hereinaforementioned disadvantages of the heretofore-known devices of this general type and which has vacuum insulation that can be evacuated in a shorter time.

With the foregoing and other objects in view there is provided, in accordance with the invention, a thermal insulation device, comprising a vacuum-tight metal housing which may be plate-shaped or block-shaped with a double wall, a molded part of thermal insulation material being enclosed by the wall of the metal housing, the molded part having a surface with groove-like recesses formed therein, and the recesses forming suction channels in conjunction with the wall of the metal housing for facilitating transport of gases during an evacuation operation.

An advantage of the structure according to the invention is that no additional components are needed.

In previous attempts at reducing the suction resistance of the system, a grid construction was inserted between a molded part of thermal insulation material and the housing wall. That was intended to ensure a spacing of the thermal insulation material from the wall and thereby to reduce the suction resistance. However, the success of that measure was not satisfactory since the grid was substantially pressed into the molded part and consequently virtually no suction cross-section was available. The costs for the grid and its installation were relatively high.

On the other hand, the construction of the molded part according to the invention achieved a marked reduction, for example a halving, of the evacuation time, and in addition saved material and installation work when compared with a construction employing a grid or other insertion parts.

In addition to channel-type recesses, according to an advantageous development pocket-like recesses can also be provided in the thermally-insulating molded part which are able to accommodate additional materials, for example gettering material.

In accordance with another feature of the invention, the wall of the metal housing has wall portions including a given wall portion to be exposed to a higher temperature than others of the wall portions, the surface of the molded part has a given surface portion facing the given wall portion, the given surface portion has local recesses formed therein, and the local recesses form chambers in conjunction with the given wall portion for accommodating gettering material, the local recesses may define a bottom of the chambers at a depth causing the preferably pellet-shaped gettering material to be forced against the given wall portion.

In accordance with a concomitant feature of the invention, the wall of the metal housing is formed of stainless sheet steel approximately 0.8 mm thick, and the suction channels have a ratio of channel depth to channel width of up to approximately 1:20 with a maximum channel depth of approximately 1.5 mm.

Other features which are considered as characteristic for the invention are set forth in the appended claims.

Although the invention is illustrated and described herein as embodied in a thermal insulation device, it is nevertheless not intended to be limited to the details shown, since various modifications and structural changes may be made therein without departing from the spirit of the invention and within the scope and range of equivalents of the claims. The construction and method of operation of the invention, however, together with additional objects and advantages thereof will be best understood from the following description of specific embodiments when read in connection with the accompanying drawing.

FIG. 1 is a diagrammatic, sectional view of a first exemplary embodiment of the invention which is taken along the line I—I of FIG. 2, in the direction of the arrows and which relates to a thermal insulation device that is constructed as a thermally-insulating wall element whose metal wall has been removed on the side which is the hot side during operation;

FIG. 2 is a section of the entire wall element which is taken along the line II—II of FIG. 1, in the direction of the arrows;

Figure 3:
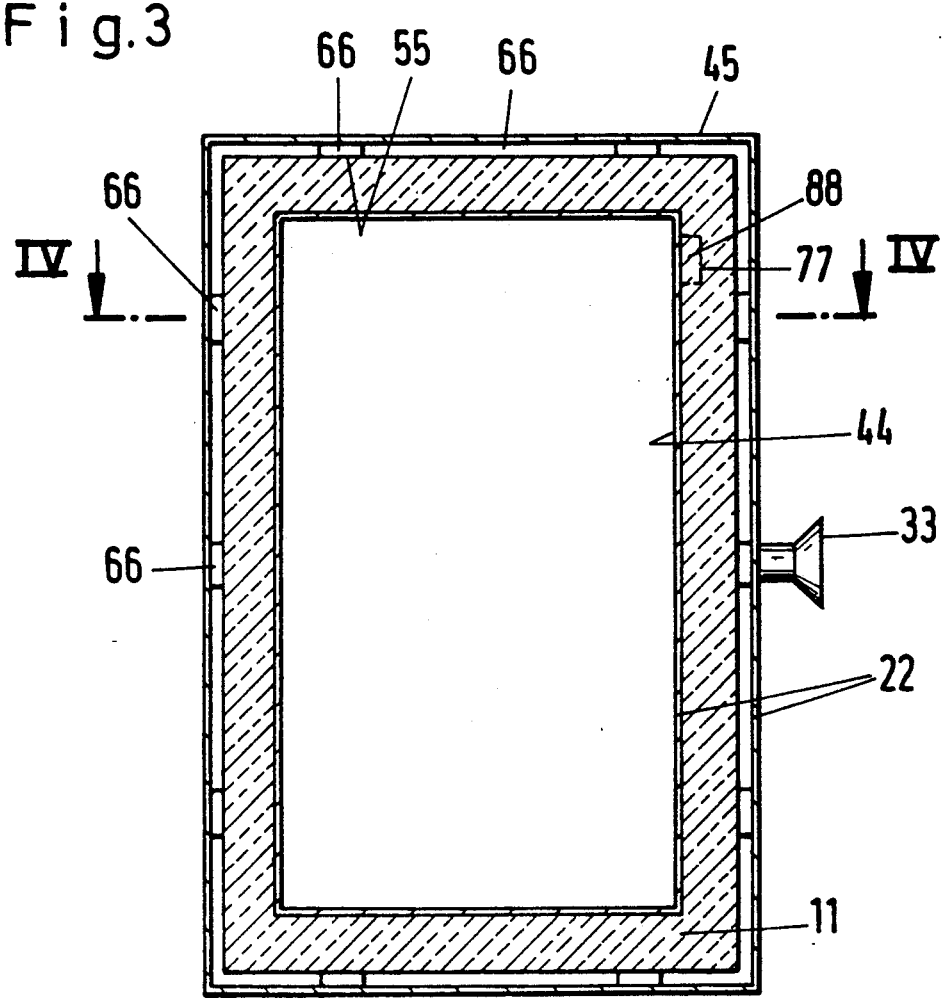
Figure 4:
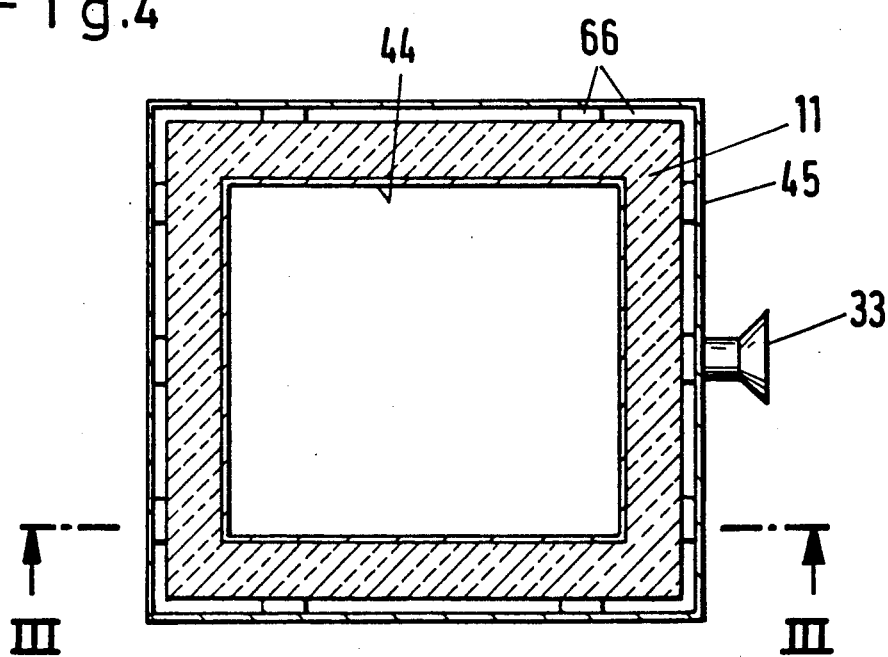

FIG. 3 is a sectional view of a second exemplary embodiment of the invention which is taken along the line III—III of FIG. 4, in the direction of the arrows and which relates to a thermal insulation device that is constructed as a block-shaped housing which could enclose a high-temperature battery, for example; and FIG. 4 is a section which is taken along the line IV—IV of FIG. 3, in the direction of the arrows.

Referring now to the figures of the drawing in detail and first, particularly, to FIGS. 1 and 2 thereof, there is seen a thermal insulating element which is constructed as a thermally-insulating wall element whose metal wall has been removed on the side which is the hot side during operation. The thermal insulating element includes a molded part or molding 1 of thermal insulation material and a metal housing 2 which surrounds the molded part 1 on all sides. The metal housing 2 has a suction flange 3 for connecting a vacuum pump. One side or given wall portion 4 of the wall of the thermal insulation element is the side intended as the hot side during operation.

The molded part 1 may be produced, for example, from ceramic or glass fiber. The molded part 1 has groove-like recesses 5 formed therein. The recesses 5 and the wall of the metal housing 2 form suction channels 6 that lead to a suction flange 3. The optimum width and depth of the recesses 5, and consequently also of the suction channels 6, depends on the wall thickness and the material of the metal housing 2. For example, for a metal housing 2 made of a 0.8 mm thick stainless steel sheet, a ratio of channel depth to channel width of up to 1:20 is beneficial, in which case the channel depth should not exceed 1.5 mm. In addition, the total channel cross-section, that is to say the sum of the cross-sections of the individual suction channels 6 should not exceed an area of 650 mm$^2$, based on a 1 m width of the thermal insulation device and 1 m for the greatest distance between the suction nipple and the most remote point of the insulation device, which is the transport path for gas molecules.

The suction channels 6 reduce the suction resistance of the system substantially, since gases to be removed during evacuation only have to traverse short distances inside the material of the molded part 1 before reaching a suction channel 6 through which the gases can be removed collectively.

According to an advantageous development of the invention, the molded part 1 additionally has local recesses 7 formed in a given surface portion thereof, which form chambers 8 together with the housing 2. The chambers 8 are disposed on the hot wall side or given wall portion 4 and are intended to accommodate gettering material. Such gettering material, which may be in pellet form, is used to bind gases, with the exception of noble gases and H$_2$O, and can be disposed in a planar distribution with the aid of the chambers 8 which may also be described as pockets.

The groove-like recesses 5 and the local recesses 7 in the molded part 1 can be produced very simply during the shaping of the thermal insulation material. However, the recesses 5, 7 should be provided only to such an extent that the thermal resistance of the thermal insulation element is not substantially altered.

A second exemplary embodiment is shown in FIGS. 3 and 4 which show sections through a thermal insulation device constructed as a block-shaped housing. Such a housing could, for example, enclose a high-temperature battery.

The representation in FIGS. 3 and 4 reveals an inner housing 44 and an outer housing 45 that together form a metal housing 22 in which a molded part 11 is embedded. The outer housing 45 has a suction flange 33. The side of the thermally-insulating molded part 11 facing the outer housing 45 has suction channels 66 formed therein which cross one another. In viewing the molded part 11 it should be observed that the section B—B is taken through a suction channel 66. Broken lines indicate that local recesses 77 which form chambers 88 for accommodating gettering material together with the inner housing 44, may be present on the side of the molded part 11 facing the inner housing 44.

FIG. 4 is also a section through a point at which a suction channel 66 is present.

We claim:

1. Thermal insulation device, comprising a vacuum-tight metal housing with a wall, a molded part of thermal insulation material being enclosed by said wall of said metal housing, said molded part having a surface with groove-like recesses formed therein, and said recesses forming suction channels in conjunction with said wall of said metal housing for facilitating transport of gases during an evacuation operation.

2. Thermal insulation device according to claim 1, wherein said metal housing is plate-shaped.

3. Thermal insulation device according to claim 1, wherein said metal housing is block-shaped.

4. Thermal insulation device according to claim 3, wherein said wall of said metal housing is an outer wall and said metal housing also has an inner wall forming a double-walled housing.

5. Thermal insulation device according to claim 1, wherein said wall of said metal housing has wall portions including a given wall portion to be exposed to a higher temperature than others of said wall portions, said surface of said molded part has a given surface portion facing said given wall portion, said given surface portion has local recesses formed therein, and said local recesses form chambers in conjunction with said given wall portion for accommodating gettering material.

6. Thermal insulation device according to claim 5, wherein said local recesses define a bottom of said chambers at a depth causing the gettering material to be forced against said given wall portion.

7. Thermal insulation device according to claim 5, wherein said local recesses define a bottom of said chambers at a depth causing pellets of the gettering material to be forced against said given wall portion.

8. Thermal insulation device according to claim 1, wherein said wall of said metal housing is formed of stainless sheet steel approximately 0.8 mm thick, and said suction channels have a ratio of channel depth to channel width of up to approximately 1:20 with a maximum channel depth of approximately 1.5 mm.

9. Thermal insulation device for a high-temperature battery, comprising a vacuum-tight housing with an inner wall and an outer wall, a molded part of thermal insulation material disposed between said inner and outer walls of said housing, said molded part having a surface with groove-like recesses formed therein, and said recesses forming suction channels in conjunction with said walls of said housing for facilitating transport of gases during an evacuation operation.

10. The thermal insulation device according to claim 9, wherein said walls of said housing have wall portions including a given wall portion to be exposed to a higher temperature than others of said wall portions, said surface of said molded part has a given surface portion facing said given wall portions, said given surface portion has local recesses formed therein, and said local recesses form chambers in conjunction with said given wall portion for accommodating gettering material.

* * * * *